May 12, 1925.

E. A. SMITH

INSECT DESTROYER

Filed May 23, 1924

INVENTOR.
E.A.Smith,
BY
Geo. P. Kimmel,
ATTORNEY.

May 12, 1925.

E. A. SMITH

INSECT DESTROYER

Filed May 23, 1924

INVENTOR.
E. A. Smith,
BY
Geo. P. Kimmel
ATTORNEY.

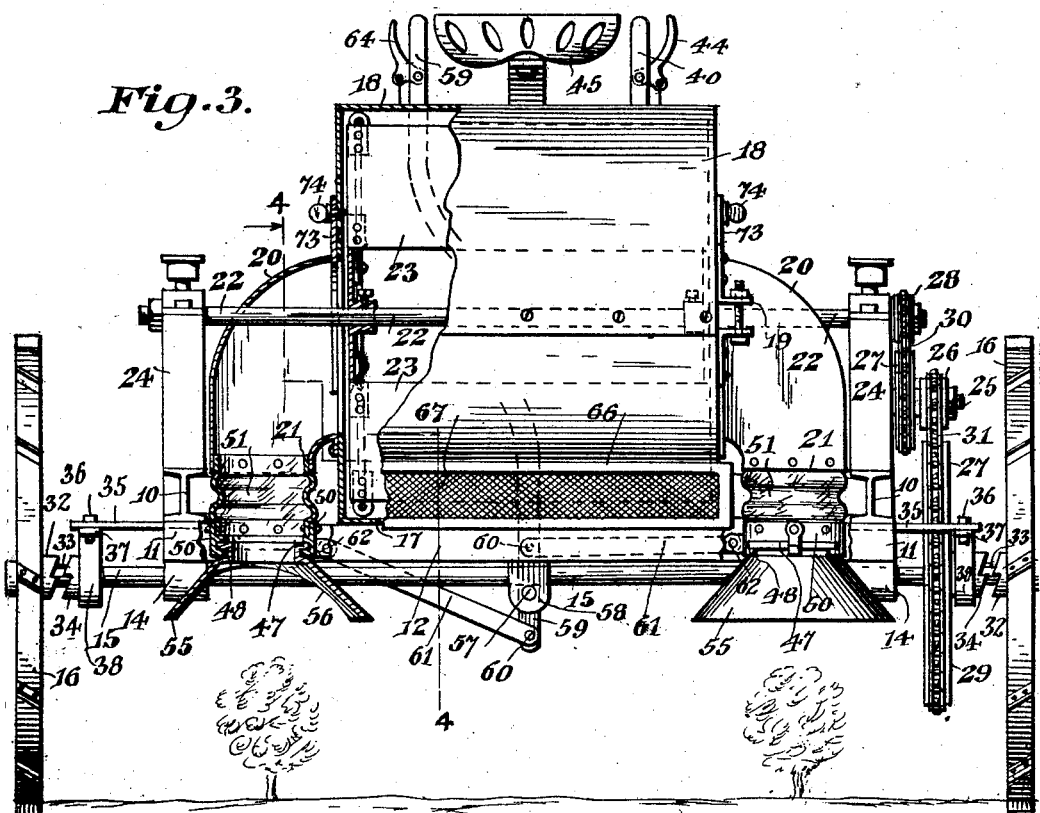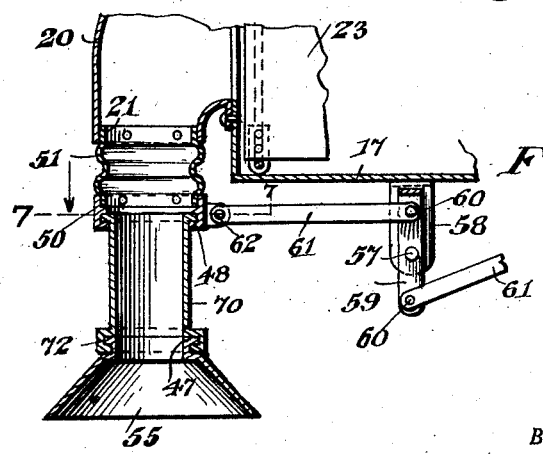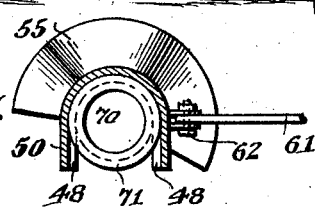

Patented May 12, 1925.

1,537,893

UNITED STATES PATENT OFFICE.

EUGENE A. SMITH, OF LA FAYETTE, GEORGIA.

INSECT DESTROYER.

Application filed May 23, 1924. Serial No. 715,373.

*To all whom it may concern:*

Be it known that I, EUGENE A. SMITH, a citizen of the United States, residing at La Fayette, in the county of Walker and State of Georgia, have invented certain new and useful Improvements in Insect Destroyers, of which the following is a specification.

This invention relates to insect destroyers, and has for one of its objects to simplify and improve the construction and increase the efficiency and utility of devices of this character.

Another object of the invention is to provide a device of this character which is movable over the growing plants and with an air suction medium operative by the forward movement of the device.

Another object of the invention is to provide a device of this character having an improved construction of the means for gathering the insects and discharging them from the gathering means.

Another object of the invention is to provide a device of this character, in which provision is made for adjusting the insect gathering elements both vertically and laterally to adapt the same to the sizes of the plants to be treated and the distance apart.

Another object of the invention is to provide a device of this character, including a suction fan and means for controlling the force of the air currents therethrough.

With these and other objects in view, the invention consists in certain novel features of construction as hereinafter shown and described and then specifically pointed out in the claims, and in the drawings illustrative of the preferred embodiment of the invention—

Figure 3 is a rear elevation, partly in section.

Figure 6 is a sectional detail illustrating one means for using the improved apparatus.

Figure 7 is a sectional detail on the line 7—7 of Figure 6.

Figure 8 is a detached elevation of one of the extension conductor shells.

Figure 1:
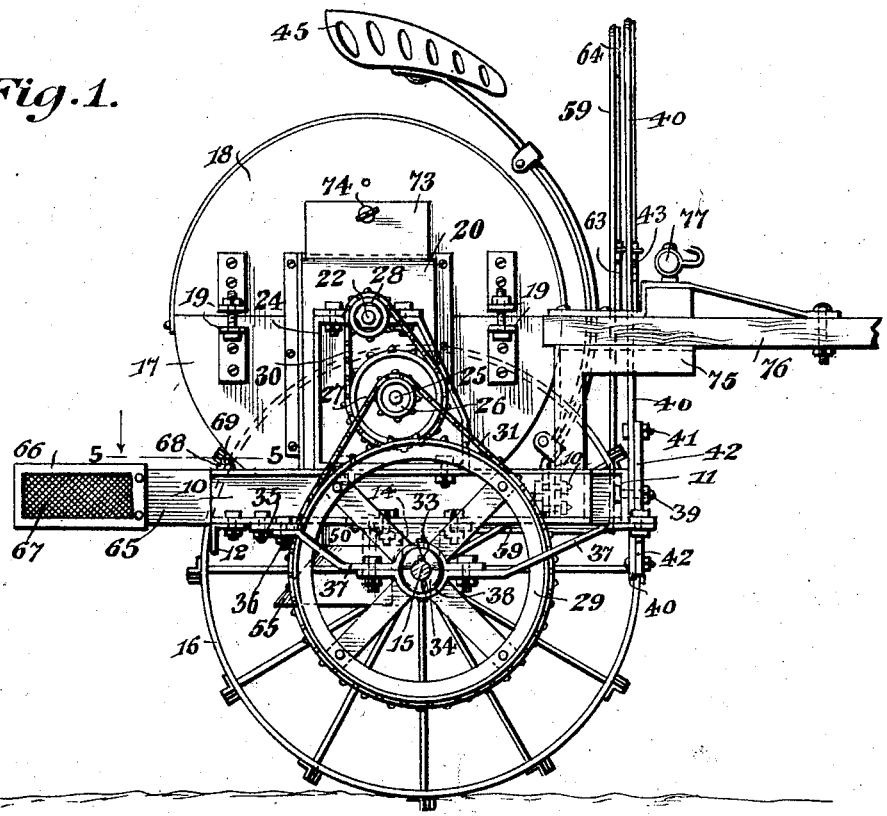
Figure 1 is a side elevation of the improved apparatus.
Figure 4:
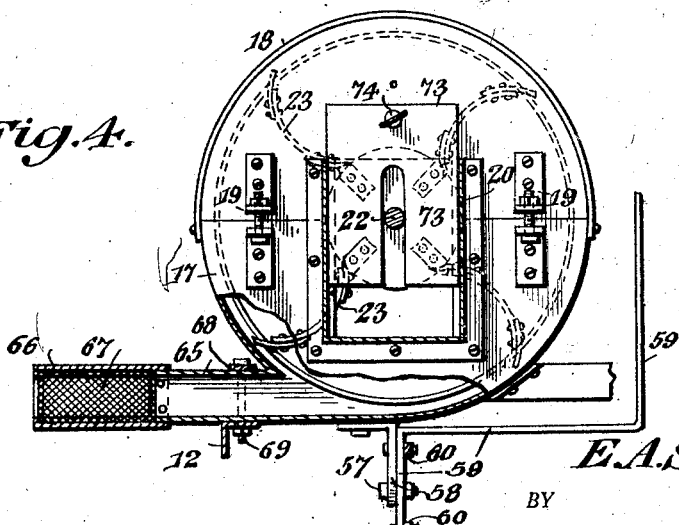
Figure 4 is a detail section on the line 4—4 of Figure 3.
Figure 2:
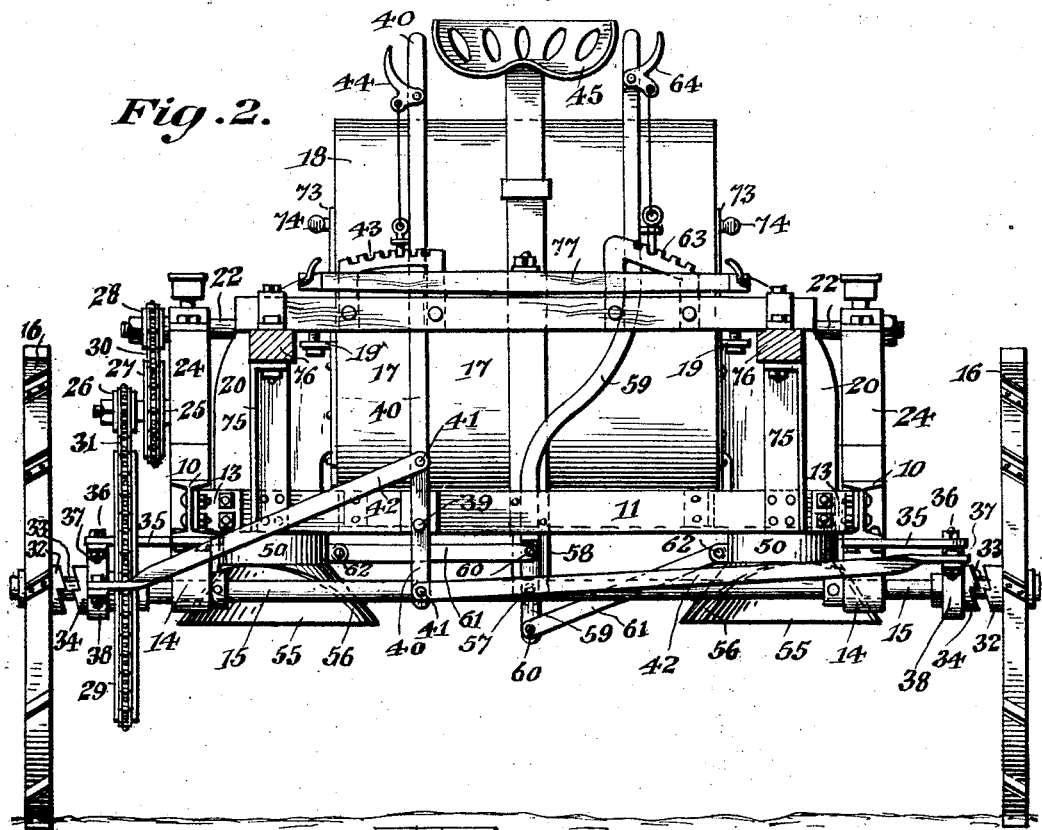
Figure 2 is a front elevation.
Figure 5:
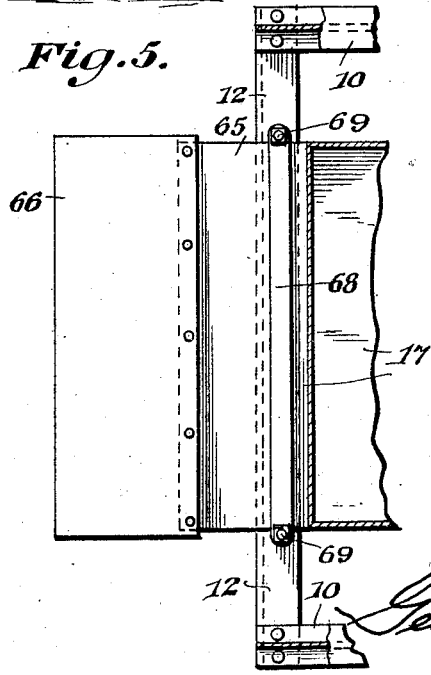
Figure 5 is a detail in section on the line 5—5 of Figure 1.

The improved apparatus includes an oblong supporting frame formed with spaced longitudinal side rails 10, preferably of I beams, forward transverse beam 11, and rear transverse beam 12. The forward frame member 11 extends between the webs of the side rails 10 and is connected thereto by L brackets 13, while the rear beam 12 extends below the lower faces of the side members 10, and is riveted or otherwise attached to the lower flanges of the same. Attached to the lower flange of each of the side rails 10 is a bearing 14, and rotatively supported in the bearings is an axle 15, having carrier wheels 16 loose thereon.

Suitably supported on the frame work of the apparatus is a fan casing formed in two portions, a lower portion, represented as a whole at 17, and an upper portion represented as a whole at 18, and detachably coupled as at 19.

Attached to opposite ends of the fan shell or casing are wind trunks 20 leading into the eyes of the casing, and with their intakes communicating with the shell at the eye portions, and directed downwardly at their intake ends as shown at 21, just inside the side rails 10.

The fan shaft is represented at 22, and carries fan blades 23, the fan shaft being supported by standards 24 rising from the side rails 10. Supported on one of the standards 24 is a stub shaft 25, and mounted for rotation on the stub shaft is a relatively small chain wheel 26 and a relatively large chain wheel 27, the chain wheels coupled to rotate together on the stub shaft. A relatively small chain wheel 28 is attached to the fan shaft 22 in alinement with the chain wheel 27, while a relatively large chain wheel 29 is mounted to rotate on the axle 15 in alinement with the chain wheel 26. An endless chain 30 engages over the alined chain wheels 27 and 28, while an endless chain 31 operates over the alined chain wheels 26 and 29. By this arrangement the motion of the larger chain wheel 29 will be communicated to the fan shaft at greatly increased speed. Attached to the hub of each carrier wheel 16 is a clutch element 32, and slidable on the axle 15 and rotative therewith as by a feather 33, are opposing clutch elements 34. Attached to each of the side rails 10 is a bracket 35, and pivoted at 36 in the outer end of each bracket, is a shipper arm 37, and attached to each shipper arm is a strap 38, the latter coacting with the shipper arm to couple the same respectively to the slidable clutch elements 34.

Pivoted at 39 to the forward transverse frame member 11 is a shipper lever 40, and pivoted at 41 to the shipper lever above and below the pivot 39 are connected rods 42, the latter being pivoted at their outer ends respectively to the shipper arms 37.

The shipper lever 40 operates over a toothed segment 43 with which a pawl device 44 mounted on the lever 40 engages, to provide means for locking the shipper lever in adjusted position. The driver's seat is represented at 45, and the shipper lever extends to a point convenient to the driver on the seat, and enables him to connect or disconnect the fan shaft relative to the axle, as required.

Attached at 21 to the intake end of each of the wind trunks 20 is a flexible tubular element 51, of canvas or the like, and attached to the free end of each flexible member is an annular coupling member 50, each including a socket element 48, at its free end, the socket element being open at one end.

Disposed below the coupling member 50 is a flaring intake member 55 and having a laterally directed flange 47 at its upper end adapted to slidably engage in the socket 48 of the coupling member 50.

At their forward sides the flaring members are respectively cut away as shown at 56, to enable the cut away portions to pass over the plants, and engage the plants and bend them downward by contact with the uncutaway rear portions of the flaring members. By this means the insects are more thoroughly shaken loose from the plants and thrown into the paths of the upwardly moving air currents.

The effectiveness of the operation is thus materially increased.

Pivoted at 57 to a hanger 58 depending from the fan casing 17, or other portion of the apparatus, is a lever arm 59, and coupled at 60 to the lever arm at opposite sides of the pivot 58, are connecting rods 61, the latter pivoted at their outer ends at 62 respectively to the coupling device 50.

The lever member 59 is extended upwardly to a point convenient to the driver on the seat 45, and operates over a toothed segment 63 with which a pawl device 64 cooperates, to enable the lever to be locked in adjusted position.

By this arrangement the coupling member 50 with the flaring intake devices 55 may be adjusted laterally as required, to adapt the apparatus to the distances between the rows of plants.

The discharge trunk of the fan is represented at 65 and terminates in a reception chamber 66 having side walls 67 of screen material, and the fan casing and its discharge trunk are retained in position by a clamp bar 68 and clamp bolts 69.

The funnel devices 55 pass over the rows of insect infested plants as the apparatus is moved over the ground, and the motion of the wheels 16, and axle 15 are imparted to the fan shaft and produce a strong suction and draw the insects into the fan casing and discharge them into the screened receptacle from which they are removed and destroyed.

By cutting away the forward portions of the funnel devices, as shown at 56, the upper portions of the plants will enter the funnel devices and be bent down by the horizontal rear portion and materially increase the efficiency.

The flaring intake devices, as shown, are detachably coupled to the coupling member 50 and two or more tubular extension members 70 are provided each with a flanged upper end 71 corresponding to the flanges 47 and with a socket 72 at the lower end corresponding to the socket 48. By this simple means by removing the flaring intake devices 55 and inserting the flanges 71 of the tubular members 70 in the socket 48 and coupling the flaring intake devices by their flanges 47 in the sockets 72, the flaring intake devices will be located nearer the ground and thus adapted to lower growths of plants, and by providing a plurality of the tubular extension members of varying lengths, the apparatus may be readily adapted to plants of any height, as will be obvious.

Slidably disposed in each of the conductor trunks 20 adjacent the side wall of the fan casing, is a cut off plate 73 each provided with means, such as a holding pin 74, to control the position of the cut off, and thus enable the intakes of the fan to be increased or decreased in area, and thus regulate the strength of the suction of the fan, to adapt it to the requirements of the apparatus.

Attached to the forward transverse member 11 are upwardly directed brackets 75 to support the thills 76 to which the single tree 77 of the draft appliance is coupled, as shown.

The chain wheels and the chains operating thereover will be housed in the ordinary manner, to protect the operators, but these form no part of the present invention, and are not illustrated.

The improved device is preferably constructed of metal except the thills 76 and the body of the single tree 77, and is therefore strong and durable and capable of withstanding the strains to which it will be subjected.

The improved device is adapted for the removal of insects from various species of plants, such as the boll wevil, potato bugs, bean beetles, army worms, and the like, and may be readily adapted to various sized plants and to plants spaced at varying distances.

The device may also be employed for removing leaves and the like from lawns by substituting an open mesh bag for the screened receptacle 65.

Having thus described the invention, what I claim is:

1. In an apparatus of the class described, a supporting frame, a fan device mounted on said frame and including a downwardly directed intake trunk, a flexible tubular member attached to the intake end of the trunk, a coupling member attached to the lower end of said flexible member and having a socket element, a flaring intake device including a lateral flange adapted to detachably engage the socket of the coupling member, and means for laterally adjusting said coupling member and the flaring intake carried thereby.

2. In an apparatus of the class described, a supporting frame, a fan device mounted on said frame and including a downwardly directed intake trunk, a flexible tubular member attached to the intake end of the trunk, a coupling member attached to the lower end of said flexible member and having a socket element, a flaring intake device including a lateral flange adapted to detachably engage the socket of the coupling member and with its forward portion cut away to enable the intake device to receive the tops of the plants and bend them downwardly as they pass thereover, and means for laterally adjusting said coupling member and the flaring intake carried thereby.

3. An apparatus of the class described, comprising a supporting frame mounted on carrier wheels, a fan element mounted on said frame and including a downturned intake wind trunk, a coupling member with a socket element in the lower end, a tubular intake member adapted to detachably engage said socket, a flexible member connected respectively to said intake wind trunk and to said coupling member, and means for laterally adjusting said coupling member and the intake member associated therewith.

In testimony whereof, I affix my signature hereto.

EUGENE A. SMITH.